(12) United States Patent
Danell et al.

(10) Patent No.: US 7,208,861 B2
(45) Date of Patent: Apr. 24, 2007

(54) ELECTROMECHANICAL DRIVE ELEMENT

(75) Inventors: Andreas Danell, Uppsala (SE); Stefan Johansson, Uppsala (SE); Johan Abrahamsson, Uppsala (SE); Jonas Eriksson, Uppsala (SE)

(73) Assignee: Piezomotor Uppsala AB, Uppsala (SE)

( * ) Notice: Subject to any disclaimer, the term of this patent is extended or adjusted under 35 U.S.C. 154(b) by 202 days.

(21) Appl. No.: 11/049,956

(22) Filed: Feb. 4, 2005

(65) Prior Publication Data
US 2006/0175932 A1    Aug. 10, 2006

(51) Int. Cl.
*H01L 41/08*    (2006.01)
(52) U.S. Cl. ................................. 310/323.02
(58) Field of Classification Search ........... 310/323.02, 310/323.12, 323.16, 332
See application file for complete search history.

(56) References Cited

U.S. PATENT DOCUMENTS

| | | | |
|---|---|---|---|
| 5,121,025 A * | 6/1992 | Toda .......................... | 310/358 |
| 6,081,063 A * | 6/2000 | Kasuga et al. ......... | 310/323.02 |
| 6,252,332 B1 | 6/2001 | Takagi et al. | |
| 6,437,485 B1 | 8/2002 | Johansson | |
| 6,747,394 B2 | 6/2004 | Johansson et al. | |
| 6,831,393 B2 * | 12/2004 | Miyazawa ............. | 310/323.14 |
| 6,882,084 B2 * | 4/2005 | Johansson et al. ..... | 310/323.02 |
| 7,061,159 B2 * | 6/2006 | Funakubo .............. | 310/323.12 |
| 7,109,639 B2 * | 9/2006 | Yamamoto et al. .... | 310/323.16 |
| 7,129,621 B2 * | 10/2006 | Sakano et al. ......... | 310/323.09 |

FOREIGN PATENT DOCUMENTS

WO   WO 2004/088831 A1   10/2004

\* cited by examiner

*Primary Examiner*—Mark Budd
(74) *Attorney, Agent, or Firm*—Young & Thompson

(57) ABSTRACT

In manufacturing electromechanical drive elements, vibration properties are defined in a test environment. These properties are found to give a good operation when being arranged in a motor. Two flexural vibration modes are defined. One is an s-mode connected to an element being strapped at two supports at respective outer portions. The s-mode have three nodal points. The other vibration mode is an ϵ-mode connected to an element being strapped at the supports and at a drive pad arranged at a middle portion. The ϵ-mode has one nodal point at each side of the middle portion and the middle portion has a stroke amplitude that is smaller than stroke amplitudes at portions between the middle portion and the nodal points. An average of the resonance frequencies of the s-mode strapped at two and three points, respectively, differs from and the ϵ-mode resonance frequency by less than 25%.

21 Claims, 10 Drawing Sheets

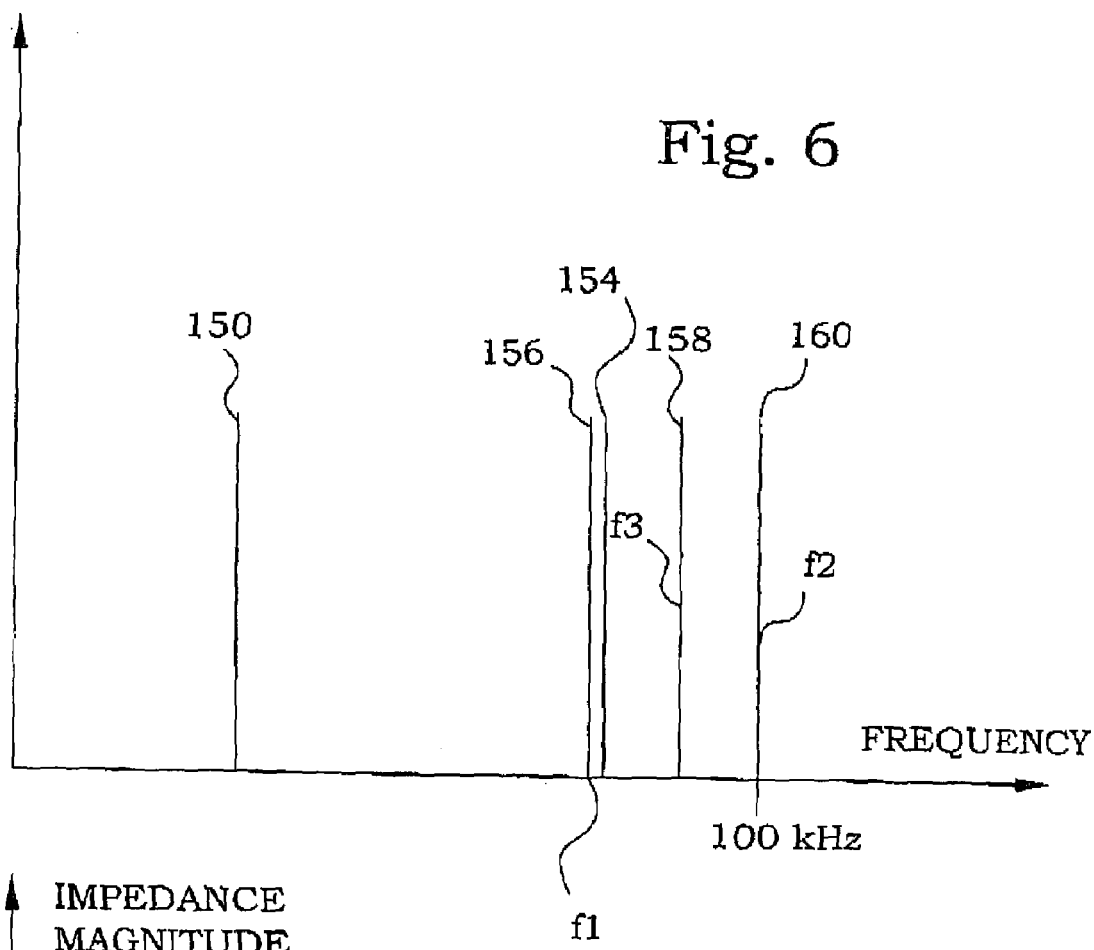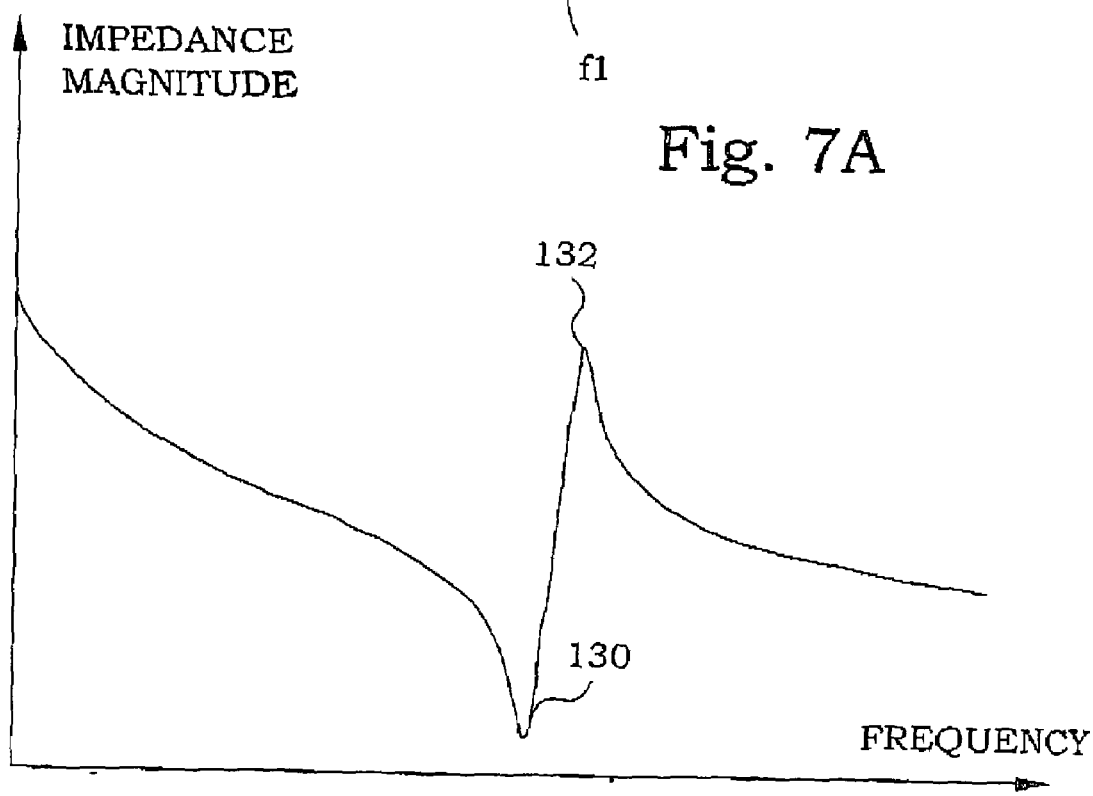

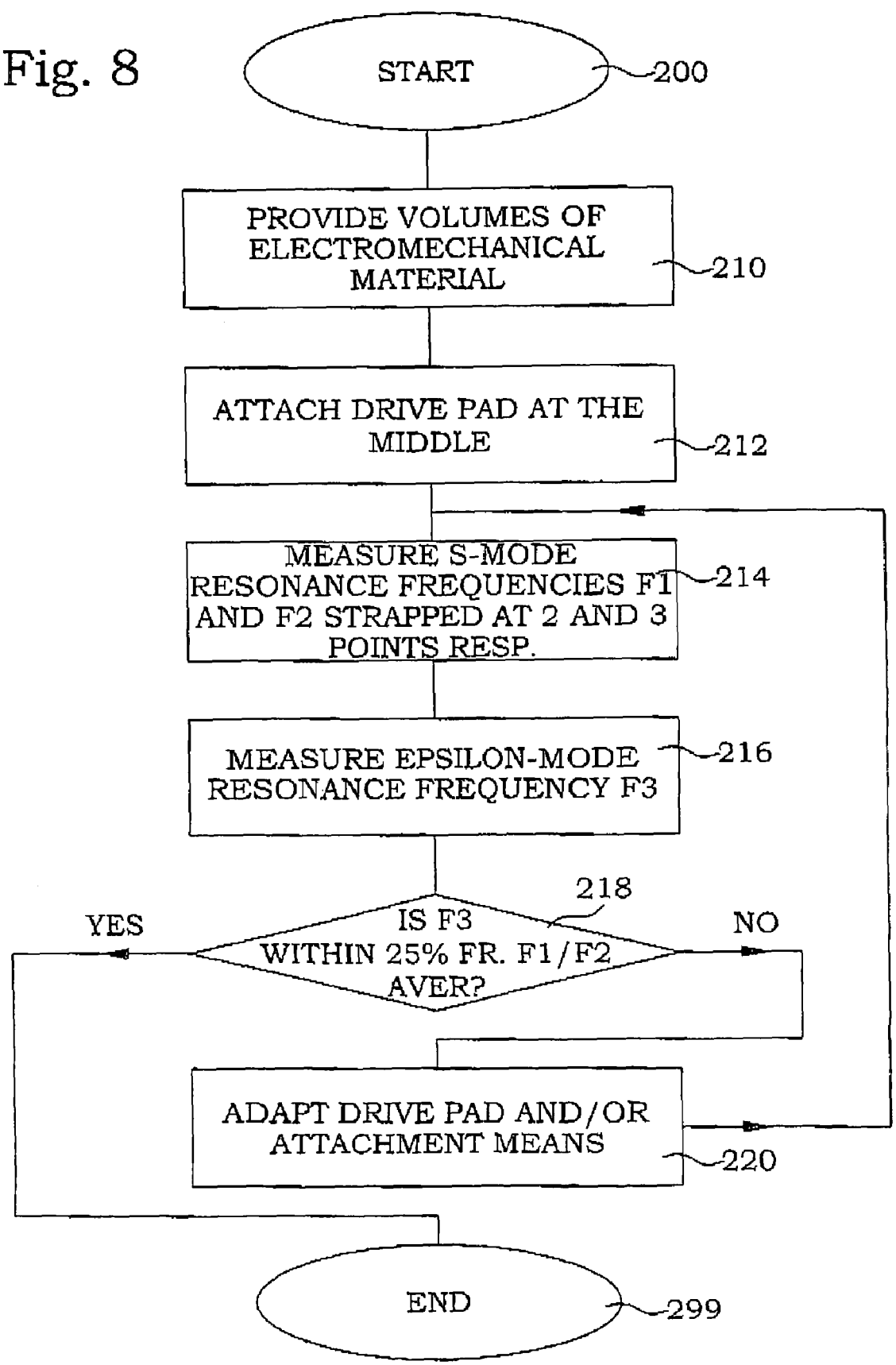

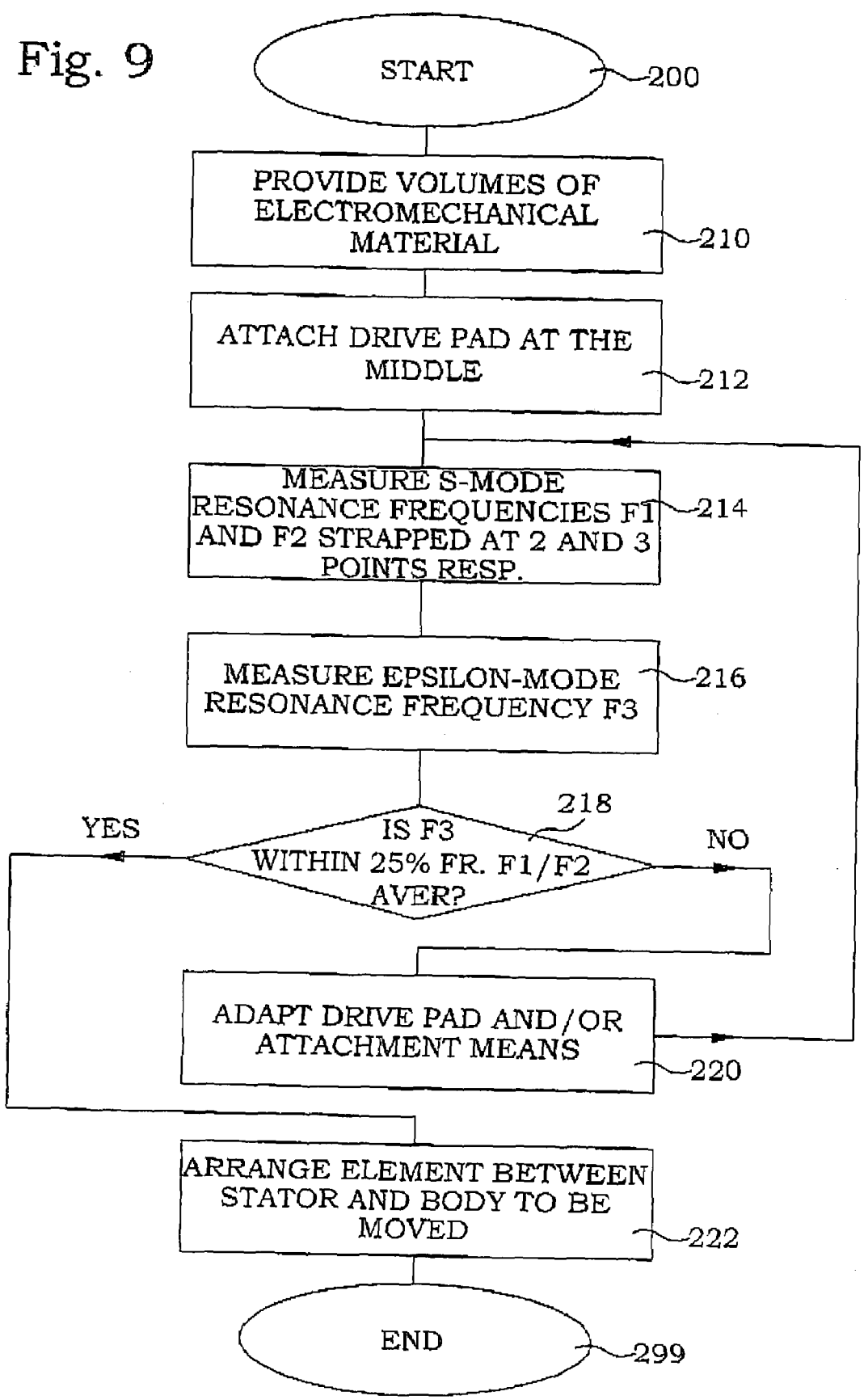

Fig. 12
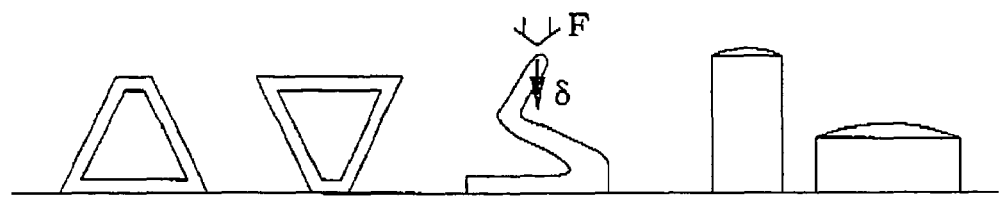
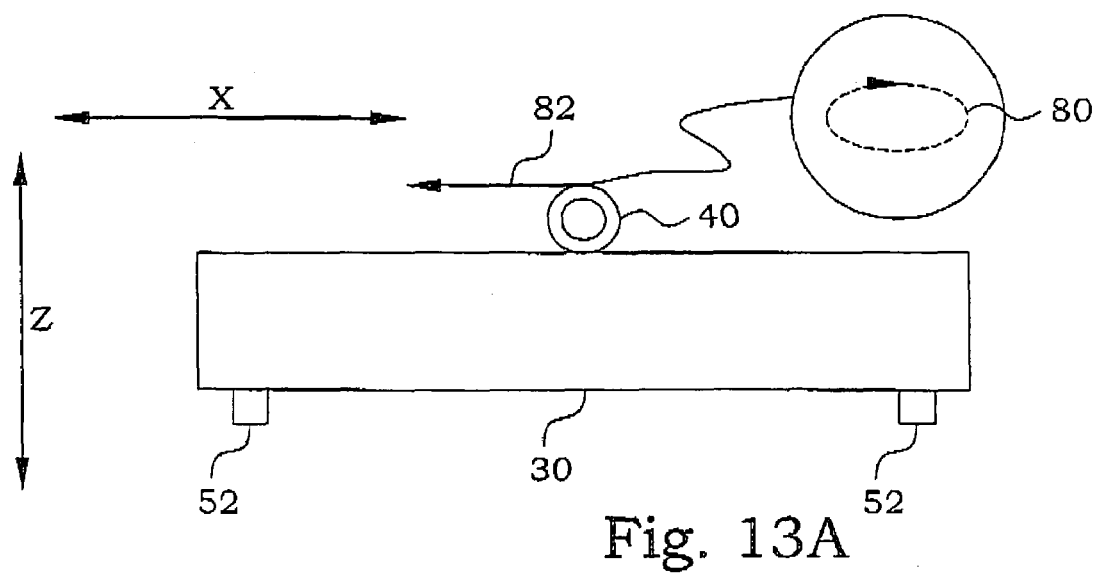
Fig. 13A
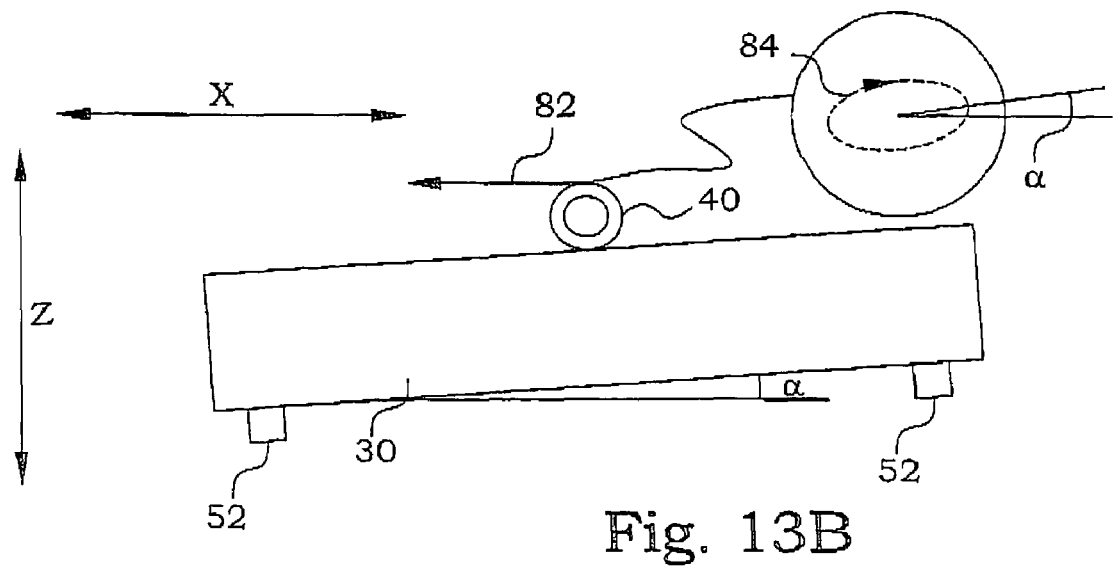
Fig. 13B

# ELECTROMECHANICAL DRIVE ELEMENT

TECHNICAL FIELD

The present invention relates in general to electromechanical drive elements, and in particular to vibration properties of electromechanical drive elements and the manufacturing of electromechanical drive elements.

BACKGROUND

Extremely miniaturised motors based on electromechanical materials are able to make controlled fine positioning using only a relatively small amount of electrical power. Consumer products have often needs for extremely small, low weight, low power consumption and inexpensive motors.

In the U.S. Pat. No. 6,437,485, an electromechanical actuator based on a double electromechanical element is disclosed. The electromechanical element mechanically supports against a stator at respective outer ends. A driving portion is attached essentially at the middle of the electromechanical element and serves as the contact against a surface of a body that is intended to be moved. By supplying well-defined voltage signals to the electromechanically active portions of the electromechanical element, the driving portion is forced to move in two dimensions for transferring a motion to the body to be moved. The basic concept has proven to be very successful and further improvements have been disclosed e.g. in U.S. Pat. No. 6,747,394.

In the published international patent application WO 2004/088831 A1, resonance behaviours have been discussed. One embodiment was a motor of the type described above. Here it was stated that the operation was favoured e.g. by designing and arranging the electromechanical element in the motor such a way that two flexural resonance frequencies were situated relatively close in frequency relative each other.

In a practical motor manufacturing, it has been shown to be relatively impractical to verify the resonance frequencies during actual operation and even more impractical to try to modify the assembled arrangement if the resonance frequencies are not present at the intended values.

SUMMARY

A general object of the present invention is to provide improved electromechanical drive elements and devices comprising such elements. A particular object of the present invention is to provide electromechanical drive elements having improved vibration properties. Another particular object of the present invention is to provide a manufacturing method giving improved reproducibility of such vibration properties.

The above objects are achieved by devices and methods according to the enclosed patent claims. In general words, preferred vibration properties of the electromechanical element are defined in a well-defined test environment. These properties are found to give a good operation when being arranged in a motor assembly. Two flexural vibration modes are defined, the resonance frequencies of which appear not too far from each other. One vibration mode is an s-mode connected to a situation where the electromechanical element is strapped at two supports at respective outer portions of the electromechanical drive element. The s-mode is a second order mode having three nodal points. The other vibration mode is an $\epsilon$-mode connected to a situation where the electromechanical element is strapped at the supports as well as at a drive pad arranged at a middle portion of the electromechanical drive element. The $\epsilon$-mode has one nodal point at each side of the middle portion and the middle portion has a stroke amplitude that is smaller than a stroke amplitude at portions of the electromechanical drive element between the middle portion and the nodal points. The resonance frequencies of the s-mode and the $\epsilon$-mode differ by less than 25% of the s-mode resonance frequency.

The drive pad properties as well as the properties of the attachment means of the drive pad are possible to use for adjusting the resonance frequencies prior to any final assembling into an electromechanical motor.

One advantage of the present invention is that adaptation of resonance behaviour of the electromechanical drive element can be performed prior to a final assembling into a motor. This opens up for achieving electromechanical drive elements having more well-defined properties that ensure a proper operation.

BRIEF DESCRIPTION OF THE DRAWINGS

The invention, together with further objects and advantages thereof, may best be understood by making reference to the following description taken together with the accompanying drawings, in which:

FIG. 6 is a diagram illustrating resonance frequencies for c-, s- and $\epsilon$-modes of vibration for different strapping situations;

FIGS. 7A–B are diagrams illustrating typical results of impedance measurements of resonance frequencies;

FIG. 8 is a flow diagram of the main steps of an embodiment of a drive element manufacturing method according to the present invention;

FIG. 9 is a flow diagram of the main steps of an embodiment of an electromechanical motor manufacturing method according to the present invention;

FIG. 12 comprises schematic illustrations of other embodiments of drive pads useful in an electromechanical drive element according to the present invention;

FIG. 13A–B are a schematic illustrations of a tilting effect occurring at large loads of an electromechanical motor according to FIG. 1.

DETAILED DESCRIPTION

Figure 1:
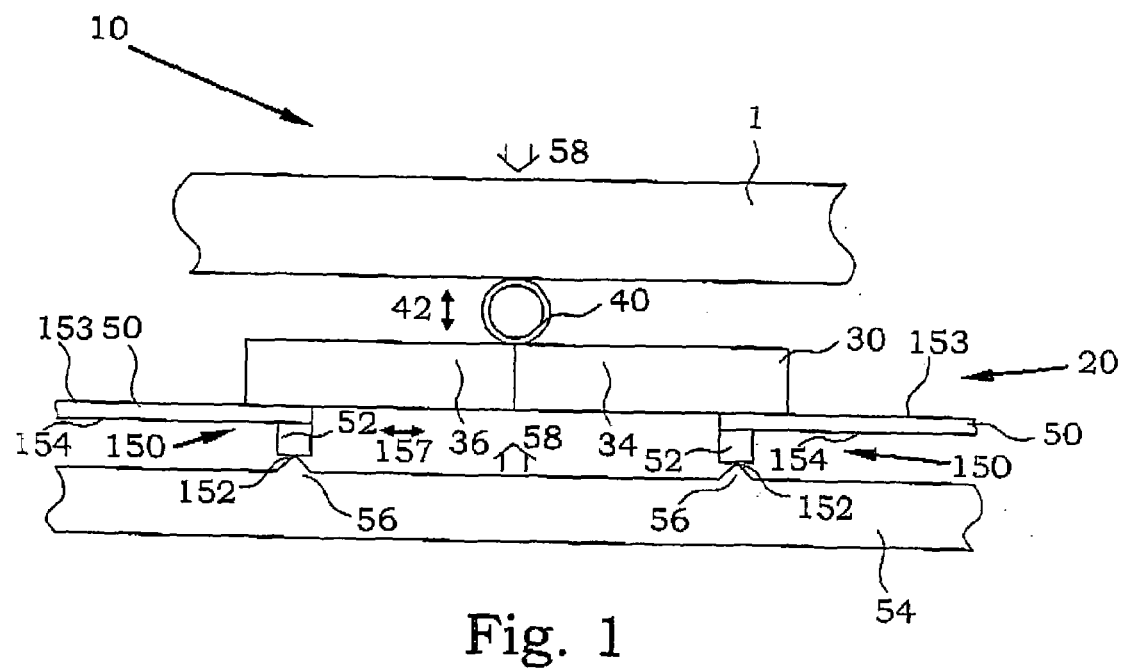
FIG. 1 is a schematic illustration of an embodiment of an electromechanical motor.

In FIG. 1, a simplified illustration of an embodiment of a double multimorph bending vibration actuator arrangement 10, in this case a motor. An electromechanical motor can be considered as an electromechanical actuator driving a body to be moved. A stator 20 comprises an electromechanical drive element 30, actuating against a body 1 to be moved by a drive pad 40. The electromechanical drive element 30 is attached to and supported by a first (upper) side 153 of a flexible printed circuit board 50. Pivot supports 52 are attached on the opposite side 154 of the flexible printed circuit board 50. The pivot supports 52 can be designed as thickened portions integrated in the flexible printed circuit board 50 or separate volumes attached by e.g. gluing. The supports 52 and the flexible printed circuit board together constitute a carrier 150 of the electromechanical drive element 30 and the flexible carrier is used for electrical and mechanical connections. A spring 54 presses the electromechanical drive element 30 against the body 1 by a normal force, illustrated by the arrows 58. The spring 54 transfers the force by tips 56 to the pivot supports 52 at a pivot point 152.

The electromechanical drive element 30 comprises in the present embodiment a piezoelectric double bimorph two, having active sections 34 and 36, respectively. The drive element 30 is drivable in bending motions with strokes up and down in the figure, as illustrated by the double arrow 42, in the present disclosure denoted as flexural motions. The bending actions of the active sections 34 and 36 create a motion of the drive pad 40 in the direction 42 as well as in directions transversal to the direction 42. The body 1 is finally moved by the interaction with the drive pad 40.

The drive element 30 is typically mechanically and electrically connected to four electrical terminals at the flexible printed circuit board 50 placed close to the pivot supports 52. The contacting between the spring 54 tips 56 and the pivot support 52 suspends the electromechanical drive element 30 in a floating manner. In other words, the carrier 150 is able to pivot relative to the spring 54 around the pivot point 152 around an axis parallel to the electromechanical drive element 30, i.e. parallel to arrow 157.

The motor is typically operated by applying two phase-shifted signals to the two phases. Four terminals; phase A and B, Gnd and Vcc are typically used. The motor operates typically in a rather large frequency range, typically around a second flexural resonance frequency and 25% therefrom. The function is similar to traditional ultrasonic motors with a contact point on a drive pad that moves along an elliptical trajectory. The movement along the driving direction—the x direction—is essentially caused by a flexural mode being closely related to a second order flexural mode resonance of a free beam. This mode includes three nodal points. This resonance is in operation widened due to different conditions when the drive element is free from contact with the drive rod and when the drive pad is in contact with the drive rod.

Consequently, the actual motion of the body 1 depends in general on the vibration motions of the electromechanical drive element 30. This vibration depends on one hand on the structure of the electromechanical material and electrodes and the voltage signals exciting the material and on the other hand on interaction with surrounding parts, such as the flexible printed circuit board 50, the drive pad 40, the body 1 itself, the pivot supports 52 and the spring 54. Parameters involving friction, elasticity characteristics, masses etc. are important for determining the actual vibration conditions for the electromechanical drive element 30. It is therefore in a general case very difficult indeed to control all such parameters with an accuracy that provides a good predictability and reproducibility. In many prior art practical cases, the design has to be tested empirically and adjusted when assembled in order to achieve a good operation. Such a situation is generally not very satisfactory, and a wish is to have a better overall control of the operation.

Figure 2A:
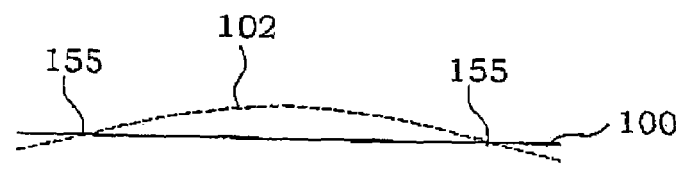
FIGS. 2A–C and 2F–H are diagrams schematically illustrating vibration modes of an electromechanical drive element.
Figure 2B:
Figure 2C:
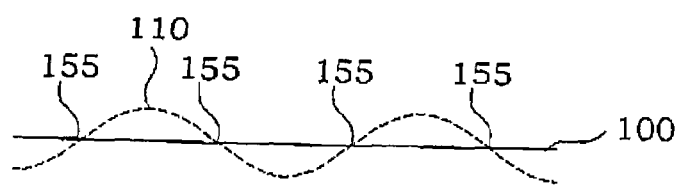

In mechanical science, the conditions of a totally free vibrating beam are fairly well understood. FIG. 2A illustrates schematically such a beam 100. Dashed curve 102 illustrates a stroke of the beam during a certain vibration mode (a first order resonance mode). Two nodal points are denoted by 155. FIG. 2B illustrates the same free beam 100 at another vibration mode, a second order resonance mode, indicated by the dashed curve 106. Three nodal points are denoted by 155. FIG. 2C illustrates the same free beam 100 at another vibration mode, a third order resonance mode, indicated by the dashed curve 110. Four nodal points are denoted by 155. Frequencies, stroke amplitudes, energy content etc. are relatively easy to determine.

Figure 2D:
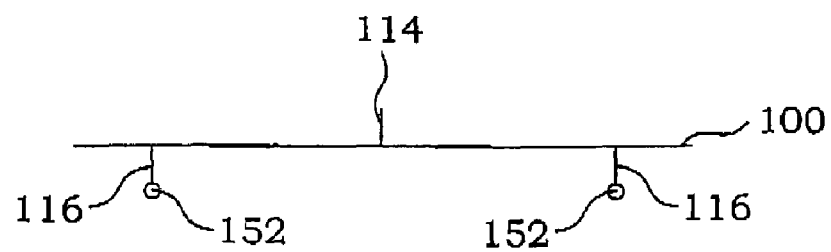
FIG. 2D illustrates an embodiment of an electromechanical drive element having a drive pad and pivot supports.

However, when such a beam 100, as illustrated in FIG. 2D is provided with a drive pad 114 and/or pivot supports 152, e.g. via a support lever 116, the situation rapidly becomes more intricate, in particular during motor operation when the drive pad is intermittently free or in contact with the body 1. In FIG. 2D, the drive pad 114 will influence the vibrations depending on its mass, spring constant, length, friction coefficient, damping characteristics, interaction properties with the drive rod etc. The translational and rotational spring and damping characteristics of the pivot points 152 and the height, spring and damping characteristics of the support levers 116 will also be of importance.

Figure 2E:
FIG. 2E illustrates strapping points for an electromechanical drive element according to the present invention.

The drive element in the present embodiment is during operation at least partly strapped to the motor stator and drive rod (or body to be moved). In FIG. 2E, the three strapping points are denoted by 118 and 120. The drive element will during operation always be strapped at, or close to, the points 118 in such a manner that translational motions in the x-direction are essentially prohibited, while rotations around the points 118 are essentially allowed. This pivot points are selected to be close to the nodal points of the desired vibration modes. As mentioned briefly above, a vibration mode having three nodal points of which two are positioned in the vicinity of the points 118 is probably deeply involved with the motion on the x-direction. As seen from FIG. 2B, a tip of a drive pad positioned at the middle of the drive element will perform a motion essentially in the x-direction. The strokes of the element resembles the letter "s" and the vibration mode is in the present disclosure denoted an "s-mode". An s-mode resonance frequency for an element only strapped at the points 118 will have a value relatively close to the corresponding resonance value of a totally free element.

In practice, the strapping of point 120 in the x-direction will need the element to be fixed in the x-directions either at the points 118 or closer to the nodal points of the element. In many cases the flexible printed circuit board, on which the drive element is typically soldered close to the nodal points, will counteract the strapping forces. The flexible printed circuit board can e.g. be glued or mechanically clamped against the motor housing. The strapping of point 120 in the z-direction is normally accomplished by a symmetric arrangement where there are equal drive elements on both sides of plane parallel body to be moved.

One way to fix the drive element in the x-direction is to use a spring to clamp the the electromechanical drive element (30) to a stable part of the actuator.

If a body to be moved, in contact with the tip of the drive pad would have an infinitely small mass and free to be moved in any direction, the vibration modes of the drive element would not be affected. However, that is not the situation. A contact between the drive pad and the body to be moved will act as an additional strapping point 120 which will change the vibration behaviour. A restriction of the translation of the drive pad in the z-direction, i.e. perpendicular to the body to be moved will not have a very large impact on the behaviour of the s-mode, since the drive pad is attached close to a nodal point. At the contrary, a restriction in x-direction translations, e.g. caused by a heavy body to move, will affect the s-mode considerably. If the motion possibilities are totally prohibited, another vibration mode, illustrated in FIG. 2F by the dashed curve 108, will occur. Let us here name it a "distorted s-mode". Consequently, a resonance frequency of such a mode will be quite different from an s-mode having no restrictions at all at the nodal point 120.

Figure 2F:
Figure 2G:
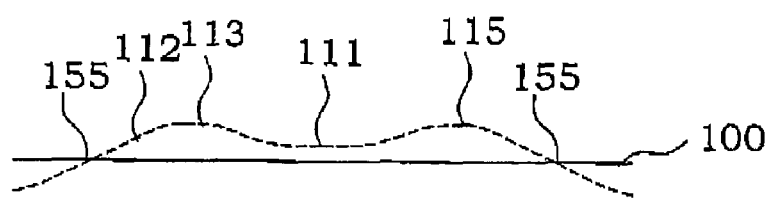

The first order flexural vibration mode, illustrated in FIG. 2A for a free element, has a resonance frequency much lower than the second order flexural vibration mode. Due to the shape of the element stroke, this mode is denoted a "c-mode" in the present disclosure. As in the case of the s-mode, strapping the element at the pivot points 118 will change the frequency somewhat for the c-mode, but will not influence the main flexural behaviour. However, the introduction of strapping at the point 120 will in this case have dramatic consequences. A restriction on the ability to move freely in the z-direction close to the point 120 will create a completely new type of vibration mode. It is found for many designs that a new type of resonance mode appears, an $\epsilon$-mode. This $\epsilon$-mode is schematically illustrated in FIG. 2G by a dashed curve 112, and is characterised in that it has two nodal points 155 and in that a middle portion 111 of the element has a stroke amplitude that is less than portions 113, 115 on either side. In other words, the $\epsilon$-mode 112 has a maximum stroke amplitude somewhere between the nodal point 155 and the middle portion 111. Nevertheless, there are no additional nodal points between the two outer nodal points 155.

Figure 2H:
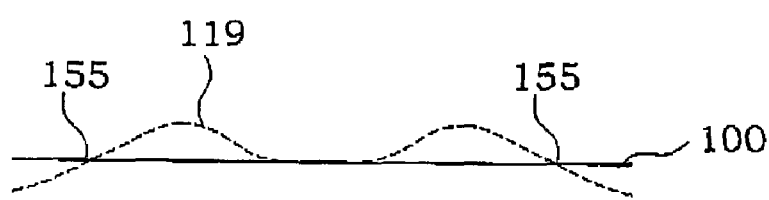

When observing the $\epsilon$-mode, one may realise that the restriction of the movement of the middle portion in z-direction is of crucial importance. However, since the $\epsilon$-mode is substantially symmetric, the behaviour in the x-direction is of no or at least less importance. A very strong and stiff strapping of the element will result in a smaller stroke for the middle portion. In an extreme, theoretical case, where the motion restriction of the middle portion is absolute, the situation becomes similar to what is shown in FIG. 2H by dashed curve 119. By comparing the situations in FIGS. 2F and 2H, one realises that the vibration conditions for the "stiff" s-mode and the "stiff" $\epsilon$-mode are the same, and they should theoretically appear at the same resonance frequency. Since the s-mode is mainly affected by motion properties in the x-direction and the $\epsilon$-mode by motion properties in the z-direction, it would be possible to adapt the element properties in such a way that the $\epsilon$-mode resonance frequency comes relatively close to the s-mode resonance frequency. In general, stiffer properties in the x-direction tend to increase the s-mode resonance frequency, while stiffer properties in the z-direction tend to increase the $\epsilon$-mode resonance frequency.

During operation, an even more complex situation occurs, since the operation cycle has to involve phases where the element releases the mechanical contact to the body to be moved. As long as a contact between the drive pad and the body exists, a situation similar to strapping the element at three points exists. However, when the drive pad releases the body, a situation similar to strapping the element at two points exists. Thus, there has to be some vibration situation that is some sort of mixture between 3-point strapping and 2-point strapping situations. Since the release period is shorter than a vibration period, the process is influenced by the excitation dynamics, and can not entirely be described in terms of the resonance frequencies related to either the 3-point or 2-point strapping case. To follow such fast courses of events is in practice extremely difficult. With the available analysing tools of today it is thus not suitable to use such direct analyses for adjusting vibration characteristics of the elements.

According to the present invention, in view of the above understanding of the related vibration modes of well characterised strapping conditions, it is instead proposed to find characteristics of such well-defined vibration modes that empirically will give good operation characteristics. It is thus found that electromechanical drive elements, having an $\epsilon$-mode resonance frequency that differs from an s-mode resonance frequency for a situation where the element is strapped just at two outer points with less than 25%, typically give motor assemblies having good operation characteristics. The measurements of the s-mode are performed when the element is strapped at two or three points. The measurements of the $\epsilon$-mode are performed when the element is strapped at pivot supports at a respective outer part of the element as well as at the drive pad. Since such measurements can be performed before the final assembly into a motor, modifications may even be performed on the elements in order to change the vibration characteristics before the final assembling.

Figure 3:
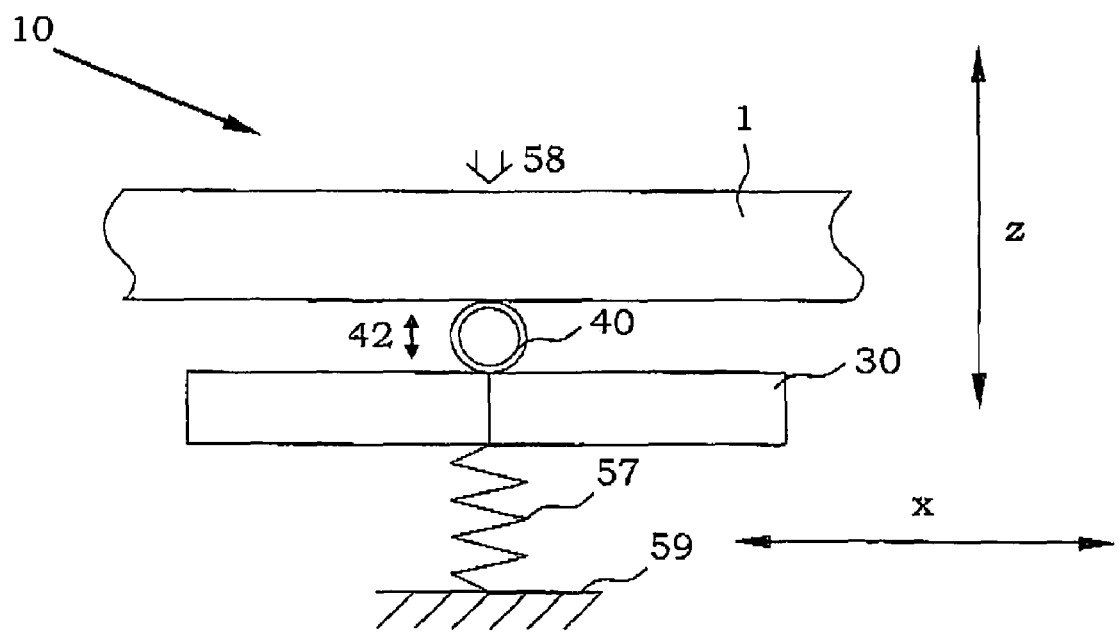
FIG. 3 is a schematic illustration of an embodiment of an electromechanical motor in which the present invention can be applied.

Motors can be built in various ways to have a controlled $\epsilon$-mode vibration. FIG. 3 is an alternative embodiment that utilized a spring 57 attached to some reasonable stable supported part 59 in the motor housing and presses in the middle of the drive element on the opposite side of the drive pad to create the normal force 58. The spring 57 has a spring constant in the z-direction that is matched with the spring constant of the drive pad side of the element and with a relatively weak spring constant in the x-direction to keep the S-mode vibrations at the desired frequency.

Figure 4:
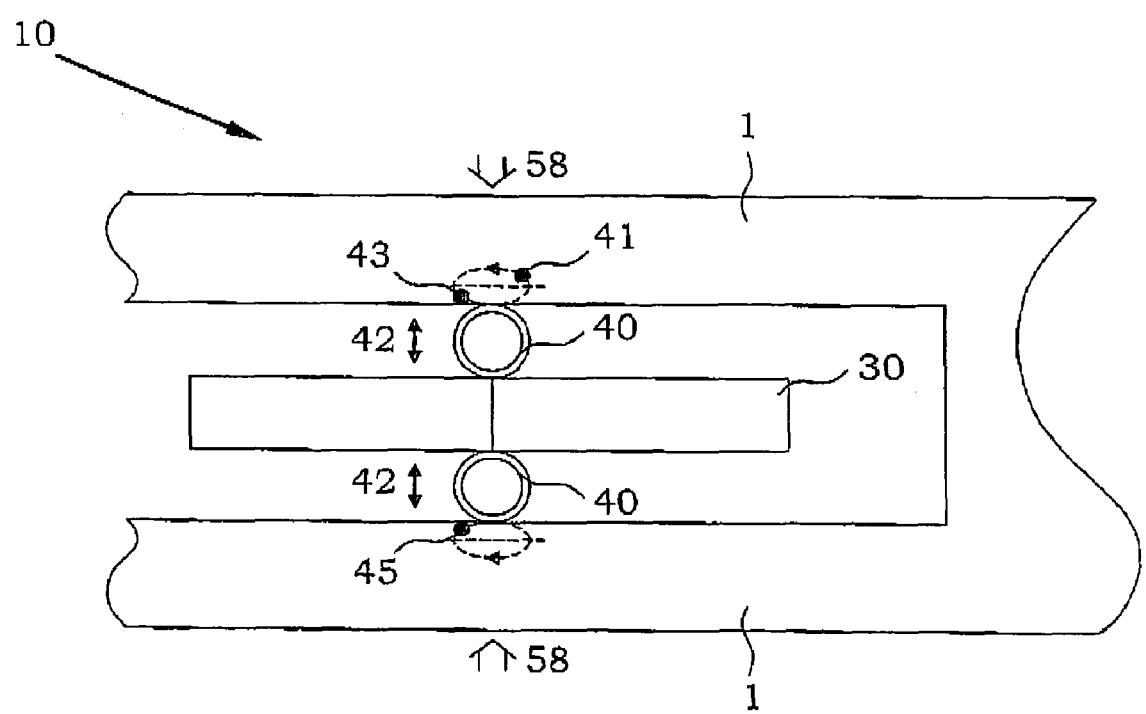
FIG. 4 is a schematic illustration of another embodiment of an electromechanical motor in which the present invention can be applied.

Another embodiment is illustrated in FIG. 4. In this case there are similar drive pads 40 on both sides of the drive element 30 and the body 1 to be moved is pressing on both drive pads 40 at the same time. The two different contact points of the drive pads 40 on this drive element 30 will both move along elliptical trajectories, illustrated by dashed lines, however in opposite directions. If one for simplicity considers the case when the drive pads 40 are in contact with the body 1 during half the movement along the elliptical trajectory, then the upper drive pad will move the body 1 to the left at contact point 41. The lower drive pad will at the same time be released 45 from the body 1. After half a cycle, the upper drive pad will release and the lower drive pad will get in contact and move the body 1 further to the left. As can be seen in the figure, the upper drive pad is then able to move back and will repeat the first cycle just after passing point 43.

Figure 5:
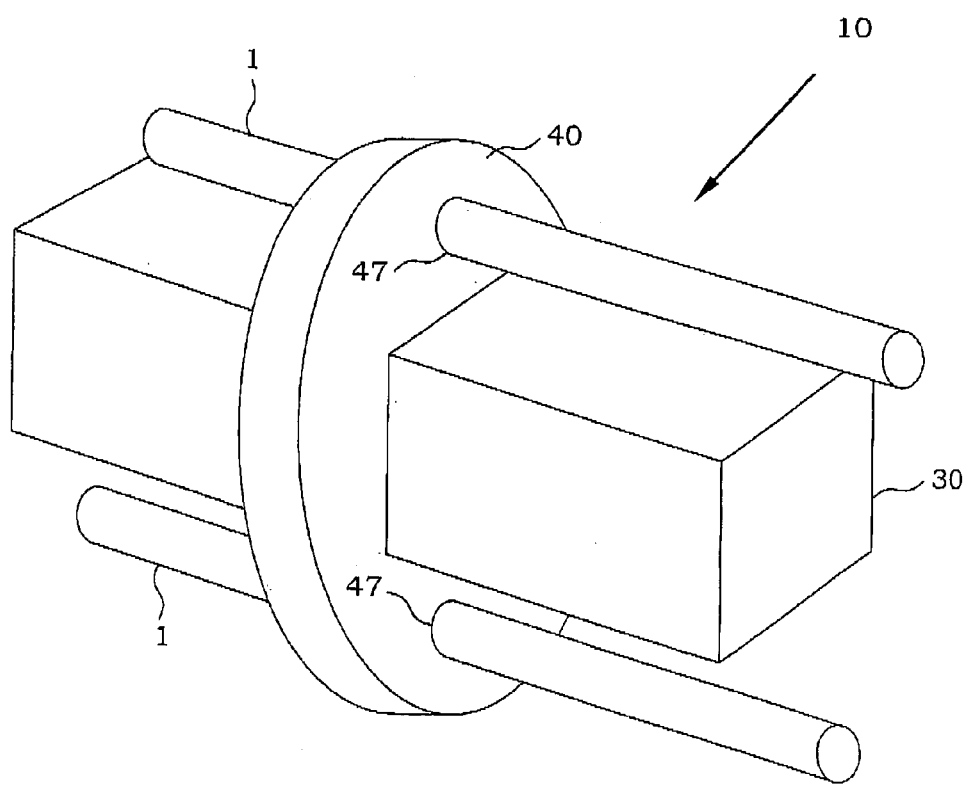
FIG. 5 is a schematic illustration of yet another embodiment of an electromechanical motor in which the present invention can be applied.

A third embodiment is illustrated in FIG. 5. In this case the drive pad 40 has a cylindrical hole 47, through which a drive rod 1 is inserted. The surface of the drive pad 40 defining the hole 47 applies a force onto the drive rod 1. The drive mechanism is similar to the one described in FIG. 4 since the hole/rod will have a spring constant creating the desired ϵ-mode vibration. The symmetrical type of arrangement with holes/rods on both sides is advantageous to avoid undesired vibrations in the system but in some case only one drive rod 1 could be used.

In both FIGS. 4 and 5 the tolerances between the drive pad 40 and the body 1 is a critical fabrication step. One technique is to use a body 1 with a rather low spring constant so that the desired normal force will be achieve within the typical manufacturing tolerances. Another fabrication technique is to use drive pads 40 in materials that have a pronounced anelasticity, i.e. they will slowly deform elastically and the tolerances will be compensated by this non-plastic deformation. Various types of plastic deformation could of course be used but then there is a risk that the normal force will decrease with time. Still, some application will tolerate the associated performance change with time.

FIG. 6 is a diagram illustrating an example of resonance frequencies. The line 150 illustrates a resonance frequency of a c-mode of a totally free (theoretical) drive element. For a test embodiment, simulations give that the resonance frequency should be around 30 kHz. An s-mode resonance frequency for the same drive element appears at about 80 kHz, as illustrated by the line 154. When strapping the drive element at positions at respective outer parts of the drive element, changes the vibration conditions. The s-mode, line 156 moves to a resonance frequency f1 of about 78 kHz. Finally, when the drive element also gets strapped at the drive pad, new types of vibration modes appear. The ϵ-mode, line 158, appears in a test setup at a resonance frequency f3 about 90 kHz. A corresponding "distorted" s-like mode (c.f. FIG. 2F), line 160, appears at a resonance frequency f2 of about 100 kHz.

The vibration resonance measurements can be performed in different manners. One way that has been proven to be possible to use is to record an impedance spectrum. A test signal with a sinusoidal shape is connected to phase terminals of the drive element. The signal has a very well defined frequency and specified amplitude. Measurement connections are connected to a ground terminal of the drive element. A measurement instrument measures the magnitude and the phase of an impedance between the test signal connections and the ground connection. This means that the real resistance as well as the complex reactance is easily derivable. The impedance is measured as a function of the test signal frequency.

A certain frequency interval is investigated by selecting an appropriate set of measurement frequencies. The magnitude of the measurements are typically plotted as a function of frequency as an impedance curve. A typical shape of an impedance curve is illustrated in FIG. 7A. A local minimum of the impedance magnitude appears at a resonance frequency 130. Similarly, a local maximum appears at an anti-resonance 132. In a symmetric drive element, such as the one presented in FIG. 1, information about the symmetry can also be achieved. By connecting the phases on the different parts of the drive element, asymmetric resonances are suppressed. This means that e.g. an s-mode, will disappear, while c-modes and ϵ-modes will remain.

Figure 7B:
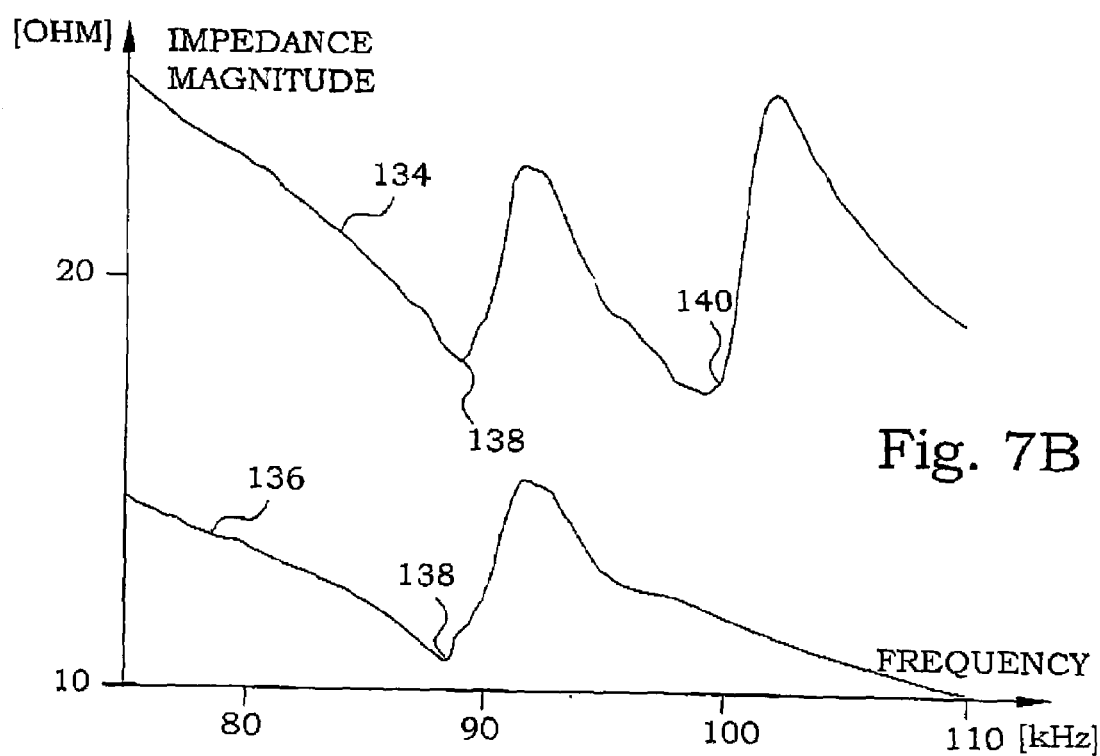

In FIG. 7B, an impedance spectrum from a drive element strapped at three points, according to the discussions above, is illustrated. The impedance spectrum is treated to suppress noise and irrelevant minor resonances. The upper curve 134 is the impedance magnitude between one phase and ground, while the lower curve 136 is the impedance between jointly connected phases and ground. The resonance 138 at 89 kHz is clearly identified as a symmetric vibration mode, in this case an ϵ-mode. The resonance 140 at about 100 kHz is an unsymmetrical mode, in this case a distorted s-mode.

FIG. 8 illustrates a flow diagram of the main steps of an embodiment of a manufacturing method of a drive element according to the present invention. The procedure starts in step 200. In step 210 volumes of electromechanical material having excitation electrodes are provided. This can be performed by any methods known in prior art. In step 212, a drive pad is attached at a middle portion of the electromechanical drive element. This attachment is in one embodiment performed by gluing. The electromechanical drive element is in step 214 strapped at two and three points and the corresponding frequencies f1 and f2 are measured. The s-mode is a vibration mode having three nodes, of which one is situated at a middle portion of the drive element. In step 216, the electromechanical drive element is additionally strapped at the drive pad and a third resonance frequency f3 of an ϵ-mode is measured. The ϵ-mode is a vibration mode having one node at each side outside the middle portion and where the middle portion has a stroke amplitude that is smaller than a stroke amplitude at portions between the middle portion and the nodes. If, as checked in step 218, the third resonance frequency f3 lies within a desired tolerance, of 25% from the average of the resonance frequency f1 and the resonance frequency f2, the procedure continues to step 299, where the procedure is ended. However, if it in step 218 is concluded that f3 does not lie within 25% from the average of f1 and f2, the procedure continues to step 220, in which the drive pad and/or means of attachment is adapted. The procedure then returns to step 214 for renewed resonance measurement.

FIG. 9 illustrates a flow diagram of the main steps of an embodiment of a manufacturing method of a motor according to the present invention. Most steps are identical to the ones shown in FIG. 8 and are not described again. When, as checked in step 218, the third resonance frequency f3 lies within a desired tolerance, of 25% from the average of the resonance frequency f1 and the resonance frequency f2, the procedure continues to step 222. In step 222, the drive element is arranged in the motor between a body to be moved and a stator. The drive pad is thereby positioned in mechanical contact with the body. The procedure ends in step 299.

The movement away from the drive rod—the z direction—is as described further above a resonance where both the drive element and the drive pad participate. All parts that are involved in the z-resonance are important, but the glue seal between the drive pad and the electromechanical material, the pad itself and the contact surface against the body to be moved are of particular importance. In a practical situation, it is preferred to determine the contact surface structure and select the material properties of the glue first and then optimise the drive pad geometry, material properties and the geometrical parameters of the glue to achieve the requested vibration characteristics.

Figure 10:
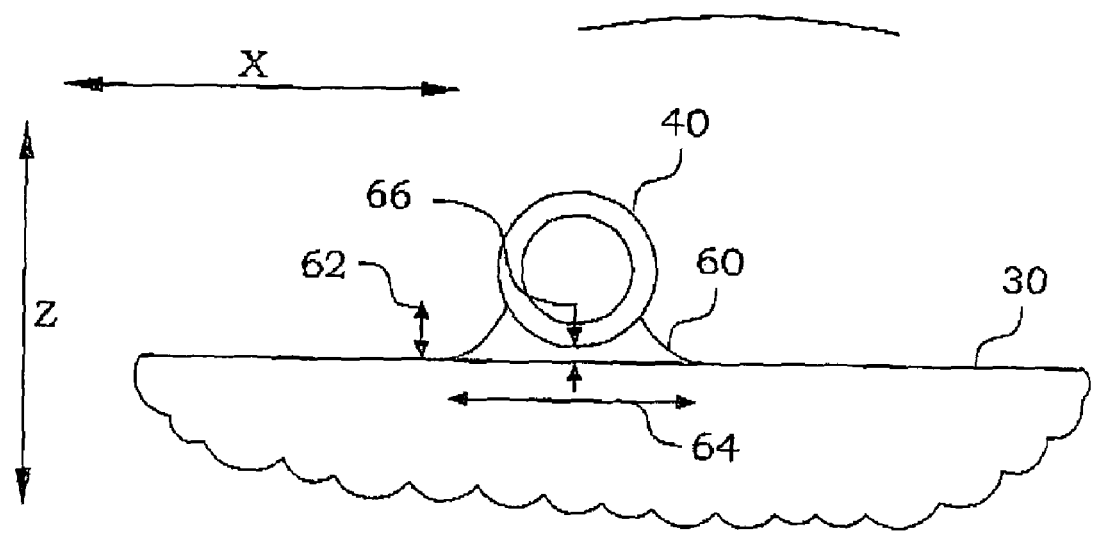
FIG. 10 is a schematic illustration of an embodiment of a drive pad useful in an electromechanical drive element according to the present invention.

The drive pad 40 is normally glued on the drive element 30 by a glue 60, as schematically illustrated in FIG. 10. In this embodiment, the drive pad 40 has the shape of a thin walled tube, which has proven to be a well operating geometry. However, other geometries and compositions are also possible. The stiffness of the glue material is of course of importance for the vibration properties of the entire drive element. Also geometrical considerations, such as thickness 66 below the drive pad 40, width 64, length parallel to the cylinder axis (not shown) and height 62 are important parameters to have good control of, since also these components are part of the vibrator design. Furthermore, the glue will have a damping effect on the vibrations that in general will give a smoother operation but at reduced stroke. The resonance frequencies will thus be shifted with a variation in glue seal, both regarding material properties and geometrical considerations.

Typically, the glue 60 cannot be perfectly symmetrical with a resulting difference in e.g. performance when driving in two opposite directions. This can be explained in terms of a tilting of the drive pad 40 in the x-direction when the drive pad 40 is compressed in the z-direction. The drive pad 40 should therefore be made in a way where this tilting is reduced to a minimum. A flat surface against the drive element 30 gives both a stable bond and a controlled stiffness in the x-directions.

Figure 11:
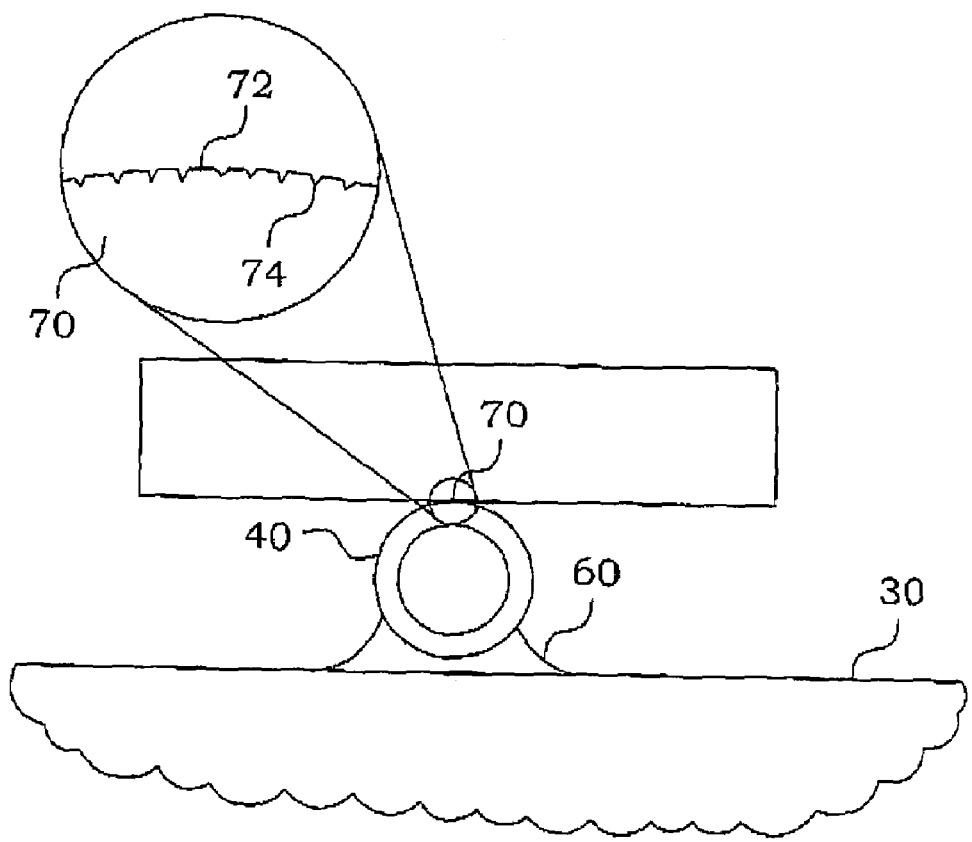
FIG. 11 is a schematic illustration of an embodiment of a drive pad and body to be moved useful in an electromechanical motor according to the present invention.

The contact surface 70, as illustrated in FIG. 11, between drive pad 40 and drive rod 1 (body to be moved) has to allow for a well-controlled contact situation. The associated spring constant of the surfaces will depend on e.g. wear. Such spring constants should not change more than what can be allowed in the particular application. One therefore has to consider e.g. the wear situation carefully. During wear, the created wear debris will generally alter the contact situation and can decrease or increase the spring constant and/or damping. Wear debris can remain as particles or be attached to the surface. It is therefore convenient to have a contact surface 70 with natural or artificial recessions 74 where the wear debris can remain without interfering with properties influencing e.g. the z-resonance. The main surface 72, however, should have a well defined, preferably flat structure. The surface should thus preferably be flat with a large number of recessions. Such surfaces can for instance be manufactured by first polishing the surface and then intentionally provide the surface with cavities, grooves or other types of recessions. Another approach is to start with a relatively rough surface and only partially planarise the surface. One particular design of drive pads 40 with teeth in contact with the drive rod 1 in the direction perpendicular to the paper in FIG. 11 has shown good results.

The friction between drive pad and rod has to be controlled carefully. A too high or too low friction coefficient will prevent motor operation. Since the friction forces will create a torque in the middle of the element, the nodal positions will be shifted slightly and this will for certain conditions increase the strokes of the contact point of the drive pad. Typically the friction coefficient has to be optimised in each particular application.

In the same manner as the surface structure of the drive pad is important for the operation characteristics, also the properties of the body to be moved are of importance. Issues regarding the body surface quality, i.e. flatness and recessions, are comparable with the drive surface considerations. Here, also the contact geometry is of interest, e.g. if it is a line contact, teeth, a convex surface etc. Moreover, the body material in general is important. For instance, the elasticity properties of the body will influence the interaction behaviour against the drive pad, as well as the support stiffness of the body. Also the mass distribution will influence the interaction with the drive pad.

Also the attachment of the pivot supports is of importance, since they may influence the actual resonance frequencies as well. Here, the spring stiffness and the spring force between the supports are of interest.

When the glue material and the surface structure has been selected, the drive pad and the geometrical considerations of the connection to the drive element have to be adjusted to get a proper function. There are several parameters that have to be controlled. Geometrical shape of the drive pad is perhaps one of the most important. Above, cylindrical drive pads have been used in the exemplifying embodiments. However, other shapes are also feasible. FIG. 12 illustrates a few more examples of interesting drive pad geometries. The two left ones have incorporated cavities, reducing the general stiffness. The geometrical shape can then be used to differentiate the stiffness in the x- and z-directions, respectively. The two right ones illustrate solid drive pads, composed by two different materials e.g. a carbon reinforced polymer. Also here, the geometrical relation between height and width gives different elastic properties in the x- and z-directions. The drive pad in the middle has a $\Sigma$ or s shape, with at least two differently inclined thin walled sections, and is designed to deform orthogonally $\delta$ to the attachment surface when a normal force F is applied. This type of design allows for tuning the spring constants in both the x- and z-directions. Typically, a movement orthogonally to the attachment surface means that the motor will have the same performance in both directions. In some applications it is desirable to have much higher force in on direction and then the drive pad can be made asymmetric so that there is a large movement also in the x-direction when it deforms in the z-direction.

The mass distribution, the fracture strength, the yield strength and wear properties of the drive pad should be carefully selected as well. Low, steady wear giving a stable friction coefficient is a good solution. The fracture strength of the drive pad and attachment material, e.g. glue, has to be high enough to withstand impacts etc. and the yield strength has to be high enough to prevent plastic deformation of the components.

There is another mechanism that also improves the function when high loads are applied. With reference to FIG. 13A, the drive element 30 is normally kept in place by springs creating normal forces at the pivot supports 52. At a small load, the contact surface of the drive pad 40 performs some kind of elliptical path 80. The x-movement is typically larger than the z-movement. When a large load is applied, as in FIG. 13B, the drive element 30 rotates due to the torque 82 caused by the frictional force at the drive pad 40. The rotation $\alpha$ of the drive element 30 makes the elliptical trajectory 84 of the drive pad 40 movement rotate with a corresponding angle $\alpha$. This rotation $\alpha$ will thus result in an increased z-movement. An increased z-movement is in turn associated with a higher driving force giving an improvement in operation. It is hence important to use springs and mechanical supports that allow the drive element 30 to rotate in this manner.

The guiding of the drive rod should preferably be made so that vibrations and drawer effects can be reduced to a minimum. Using a small play between the guiding parts reduces the friction and allows for a higher output force.

A motor comprising drive elements according to the present invention could be driven with one or two simple square wave signals. If an inductor is used in series with the motor phases, and the voltage has to be fixed, the voltage at the motor phases has to be adjusted by other means. One good solution is to vary the duty cycle of the square wave in order to adjust the phase voltage. This solution is well compatible with modern digital electronics and gives a method to adjust the speed of the motor. The duty cycle will therefore be directly related to the speed. Another common method to adjust the speed is to vary the phase shift between two signals that are applied to the phases A and B.

Figure 14:
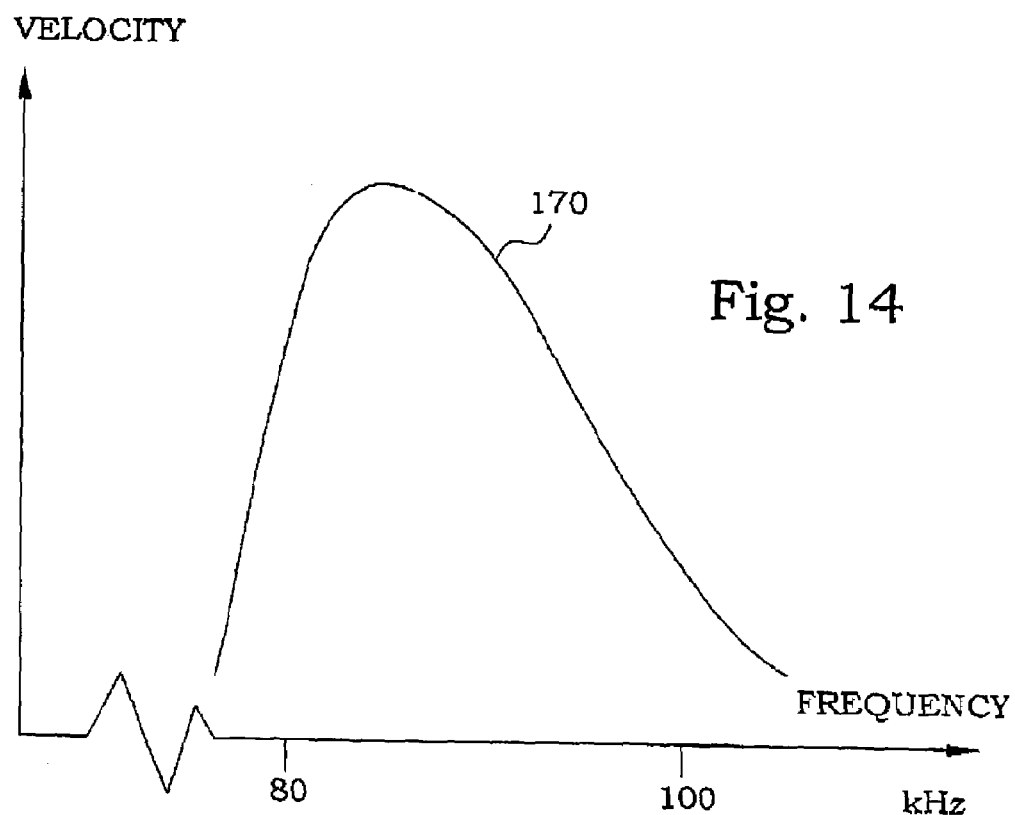
FIG. 14 illustrates a typical relation between drive frequency and drive velocity in an embodiment of an electromechanical motor according to the present invention.

The drive elements according to the present invention also allows for another way of adjusting the driving speed. The motors typically have a relatively large operating frequency range, typically with the (three-point-strapped) $\epsilon$-mode positioned inbetween the (two- and three-point-strapped) second order resonance frequencies. This gives normally a driving speed of the drive rod that is related to the frequency. An example of such a relation is illustrated in FIG. 14, by the curve 170. The driving speed could therefore be adjusted by simply varying the frequency, which is very convenient in several applications.

Throughout the present disclosure, certain details of the accompanying figures have been drawn enormously exaggerated in order to visualise effects that are very small in practical cases. The drawings should therefore not be considered as drawn in any particular scale, and comparisons between different sizes within one and the same figure may not be adequate.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. Electromechanical drive element comprising:
    volumes of electromechanical material;
    electrodes for exciting said volumes;
    a drive pad attached at a middle portion of said electromechanical drive element;
    said electromechanical drive element, when being strapped at two pivot supports at respective outer portions of said electromechanical drive element, having a vibration s-mode with a first resonance frequency f1;
    said electromechanical drive element, when being strapped at said drive pad and at said two pivot supports at respective outer portions of said electromechanical drive element, having a vibration distorted s-mode with a second resonance frequency f2;
    said s-mode being a vibration mode having three nodes, of which one is situated at said middle portion;
    said electromechanical drive element, when being strapped at said drive pad and at said two pivot supports, having a vibration $\epsilon$-mode with a third resonance frequency f3;
    said $\epsilon$-mode being a vibration mode having one node at each side outside said middle portion and where said middle portion has a stroke amplitude that is smaller than a stroke amplitude at portions between said middle portion and said nodes;
    whereby f3 differs from an average of f1 and f2 by less than 25%.

2. Electromechanical drive element according to claim 1, wherein said pivot supports are positioned in the vicinity of the two outer nodes of said s-mode.

3. Electromechanical drive element according to claim 1, wherein said drive pad is glued to said electromechanical drive element, whereby at least one of elasticity properties of said glue, vibration damping properties of said glue, position at which said glue is applied, and amount of glue is selected to provide a requested third resonance frequency f3.

4. Electromechanical drive element according to claim 1, wherein a surface area of said drive pad, which is intended for actuating operations is a substantially flat area provided with recessions.

5. Electromechanical drive element according to claim 1, comprising one said drive pad on each side of said electromechanical drive element, enabling interaction with body to be moved at two different points.

6. Electromechanical drive element according to claim 1, wherein said drive pad comprises a hole, through which a body to be moved is intended to be put, whereby surfaces encircling said hole actuate on said body to be moved.

7. Electromechanical drive element according to claim 1, wherein said drive pad comprises material having anelasticity properties.

8. Electromechanical drive element according to claim 1, wherein said drive pad has a $\Sigma$-shape or an s-shape.

9. Electromechanical drive element according to claim 1, wherein said drive pad is solid and at least partly made of a reinforced polymer.

10. Electromechanical drive element according to claim 1, wherein said drive pad has an asymmetric deformation with a large movement in one preferred x-direction when it deforms in the z-direction.

11. Electromechanical actuator comprising:
    a main stator;
    a body to be moved; and
    at least one electromechanical drive element arranged between said main stator and said body;
    said electromechanical drive element in turn comprising:
    volumes of electromechanical material;
    electrodes for exciting said volumes;
    a drive pad attached at a middle portion of said electromechanical drive element;
    said drive pad being arranged in mechanical contact with said body;
    said electromechanical drive element, when being strapped at said two pivot supports at respective outer portions of said electromechanical drive element, having a vibration s-mode with a first resonance frequency f1;
    said electromechanical drive element, when being strapped at said drive pad and at said two pivot supports at respective outer portions of said electromechanical drive element, having a vibration distorted s-mode with a second resonance frequency f2;
    said s-mode being a vibration mode having three nodes, of which one is situated at said middle portion;
    said electromechanical drive element, when being strapped at said drive pad and at said two pivot supports, having a vibration $\epsilon$-mode with a third resonance frequency f3;
    said $\epsilon$-mode being a vibration mode having one node at each side outside said middle portion and where said middle portion has a stroke amplitude that is smaller than a stroke amplitude at portions between said middle portion and said nodes;
    whereby f3 differs from an average of f1 and f2 by less than 25%.

12. Electromechanical actuator according to claim 11, wherein a surface area of said body, which is intended to be actuated on by said drive pad is a substantially flat area provided with recessions.

13. Electromechanical actuator according to claim 11, comprising springs, clamping said pivot supports to said main stator, arranged to allow for minor rotations along an axis parallel to a displacement direction of said body relative to said electromechanical drive element.

14. Electromechanical actuator according to claim 11, comprising one said drive pad on each side of said electromechanical drive element, enabling interaction with body to be moved at two different points.

15. Electromechanical actuator according to claim 14, wherein said drive pads on each side of said electromechanical drive element interact with the same body to be moved, but at two different points.

16. Electromechanical actuator according to claim 11, comprising two said electromechanical drive elements interacting in cooperation on opposite sides of said body to be moved.

17. Electromechanical actuator according to claim 11, wherein said drive pad comprises a hole, through which said body to be moved is put, whereby surfaces encircling said hole actuates on said body to be moved.

18. Electromechanical actuator according to claim 11, wherein said drive pad comprises material having anelasticity properties.

19. Electromechanical actuator according to claim 11, wherein said electromechanical drive element is attached to a flexible printed circuit board that is attached to a motor housing by glue or by mechanical clamping means.

20. Electromechanical actuator according to claim 11, wherein said electromechanical drive element is clamped in the x-direction by a spring.

21. Electromechanical actuator according to claim 11, comprising spring means supported at a motor housing and arranged to press on said drive element at a position in the middle of said electromechanical drive element on an opposite side to the drive pad.

* * * * *